United States Patent [19]

Küpfer

[11] 4,315,260

[45] Feb. 9, 1982

[54] METHOD AND APPARATUS FOR MEASURING THE DISTANCE BETWEEN A PRIMARY STATION AND A SECONDARY STATION

[75] Inventor: Hanspeter Küpfer, Uitikon, Switzerland

[73] Assignee: Siemens-Albis Aktiengesellschaft, Zürich, Switzerland

[21] Appl. No.: 74,234

[22] Filed: Sep. 10, 1979

Related U.S. Application Data

[63] Continuation-in-part of Ser. No. 888,024, Mar. 20, 1978, abandoned.

[30] Foreign Application Priority Data

Apr. 7, 1977 [CH] Switzerland ............... 4433/77

[51] Int. Cl.³ ............................................ G01S 13/32
[52] U.S. Cl. ............................. 343/7.5; 343/14
[58] Field of Search ........................ 343/7.5, 14

[56] References Cited

U.S. PATENT DOCUMENTS

| | | | |
|---|---|---|---|
| 2,779,018 | 1/1957 | Gregoire et al. | 343/7.5 X |
| 3,461,452 | 8/1969 | Welter | 343/14 X |
| 3,713,149 | 1/1973 | Bruner et al. | 343/7.5 X |
| 4,151,525 | 4/1979 | Strauch et al. | 343/7.5 X |

FOREIGN PATENT DOCUMENTS 1419536 12/1975 United Kingdom.

*Primary Examiner*—T. H. Tubbesing
*Attorney, Agent, or Firm*—Werner W. Kleeman

[57] ABSTRACT

A method and apparatus for measuring the distance between a primary station and a secondary station, each having an antenna for transmitting and receiving continuous wave signals, modulated by a measuring signal, the distance being determined at the primary station as a magnitude proportional to the quotient of the phase difference between the measuring signals of the transmitted and the received signals and the measuring signal frequency. The primary station transmits a continuous wave signal modulated by a measuring signal which in turn can be frequency modulated by the measuring signal frequency. At the secondary station this modulated continuous wave signal is additionally modulated by a marking signal and reflected to the primary station as the receiving signal. At the primary station there is obtained from the filtered mixed product from the signal reflected by the secondary station and a local oscillator signal of the primary station a useful signal which is freed of the continuous wave frequency and the measuring signal frequency. There is obtained from the useful signal by amplitude demodulation an evaluation signal freed from the marking signal frequency. The evaluation signal which is dependent upon the phase difference between the measuring signals of the transmitted and received signals is employed in a regulation circuit for a change of the mean measuring signal frequency of the measuring signal of the transmitted signal such that the mean phase difference between the measuring signals of the transmitted signals and the reflected signals assumes a predetermined value at its steady-state condition.

17 Claims, 8 Drawing Figures

METHOD AND APPARATUS FOR MEASURING THE DISTANCE BETWEEN A PRIMARY STATION AND A SECONDARY STATION

CROSS-REFERENCE TO RELATED CASE

This is a continuation-in-part of my commonly assigned, copending U.S. application Ser. No. 888,024, filed Mar. 20, 1978 now abandoned.

BACKGROUND OF THE INVENTION

The present invention relates to a new and improved method of, and apparatus for, measuring the distance between a primary station and a secondary station, each having an antenna for transmitting and receiving continuous wave signals modulated by a measuring signal, the distance at the primary station being determined as a magnitude proportional to the quotient of the phase difference between the measuring signals of the transmitted and received signals and the measuring signal frequency.

For measuring the distance between a primary station and a secondary station, there can be employed, apart from optical devices or radar-like devices operating in a pulse mode, also devices wherein the distance is determined by modulation of a microwave. One such type of prior art microwave-distance measuring system is disclosed, for instance, in the German literature entitled "Allgemeine Vermessungs-Nachrichten" February 1971, pages 50–60. It consists of two stations, each having a transmitter, a receiver, a parabolic antenna, a mixer, a control device, a measuring signal-source, and a response device. Additionally, the primary station is equipped with a phase measuring device and the secondary station with a pulse circuit as well as a synchronization circuit. This equipment is particularly suitable for measuring intermediate and large distances, since its range is hardly impaired by adverse weather and visual conditions. This state-of-the-art microwave distance measuring device operates in a manner such that after establishing a connection between both of the stations the carrier signal at each station is modulated by a measuring signal and transmitted as a measuring wave in the direction of the other station. Each station receives the delayed measuring wave of the other station and there is determined the momentary phase position with respect to the inherent transmitted measuring wave. The momentary phase position of the secondary station is further transmitted to the primary station in the form of an additionally modulated signal and at that location compared with its own phase position. Since the difference between the phase positions or phases determined at the primary station and secondary station is proportional to the distance, this difference is determined by the phase measuring device of the primary station, converted into a digital distance measuring result and then displayed.

The construction of such microwave-distance measuring device is relatively complicated, especially as concerns the secondary station which essentially consists of the same components as the primary station. Additionally, such secondary station is not readily portable owing to its relatively large weight.

SUMMARY OF THE INVENTION

Hence, it is a primary object of the present invention to overcome the aforementioned drawbacks and limitations of the prior art equipment.

Still another significant object of the present invention is to provide a new and improved method of, and apparatus for, distance measurement which requires appreciably lesser equipment expenditure, especially as concerns the secondary station.

Still a further significant object of the present invention is to provide an improved method of, and apparatus for, measuring the distance between two points in an extremely reliable, efficient and highly accurate manner, particularly meeting geodetic surveying accuracy requirements.

Now in order to implement these and still further objects of the invention, which will become more readily apparent as the description proceeds, the method of the present invention is manifested by the features that there is transmitted by the primary station a continuous wave signal modulated by a measuring signal which in turn can be frequency modulated by the measuring signal frequency. At the auxiliary station there is additionally modulated such modulated continuous wave signal by a marking signal and reflected to the primary station as the receiving signal. In the primary station there is obtained from the filtered mixed product of the signal reflected by the secondary station and a local oscillator signal of the primary station a useful signal which is freed of the frequency of the continuous wave signal and the frequency of the measuring signal. From the useful signal there is obtained by amplitude demodulation an evaluation signal freed of the frequency of the marking signal. This evaluation signal which is dependent upon the phase difference between the measuring signals of the transmitted and received signals is employed in a regulation circuit for changing the mean frequency of the measuring signal of the transmitted signal in such a manner that at least the mean phase difference between the measuring signals of the transmitted signals and the reflected signals assumes a predetermined value at the momentary steady-state condition. This method is advantageously manifested by its high sensitivity and accuracy and thus, enables performance of precision distance measurements over relatively large distances.

As already alluded to above, the invention is not only concerned with the aforementioned method aspects, but also relates to apparatus for the performance thereof, which apparatus comprises a circuit composed of an active primary station and a simply constructed and power saving secondary station, the primary station comprises a continuous signal or continuous wave oscillator, an antenna, a primary modulator, a mixer and a microwave coupling circuit. In particular, the circuit of the invention is manifested by the features that the mixer is connected with a distance evaluation circuit equipped with a measuring signal frequency generator connected at its output side with the primary modulator and with a measuring device. The measuring signal frequency generator comprises a controlled oscillator which modulates the frequency of the measuring signal and controls such to assume a mean or average value. The input of the measuring signal frequency generator is connected by means of a bandpass filter with the mixer.

This circuit advantageously enables utilization of a secondary station of low expenditure in fabricated equipment, and additionally affords high sensitivity and thereby enables the measurement of distances over a range which supersedes by a multiple that of optical distance measuring apparatus, especially for all-weather operation.

According to a further manifestation of the invention, it is possible when practising the method aspects to determine the distance extremely accurately and without any ambiguity as a magnitude proportional to the mean duration of the periods of the measuring signal. Further, there can be selected as the starting condition for the build-up or assumption of the steady-state of the frequency regulation circuit, a sufficiently low mean measuring signal frequency and after the assumption of the steady-state of the regulation circuit the accuracy of the distance measurement can be improved by continuing the regulation to a predetermined value of the mean phase difference by the incremental increase of the mean measuring signal frequency by integer jump factors and which increases avoid losses in unambiguity. Distance measuring apparatus working according to such method, with appropriate automation, can be advantageously operated by unskilled personnel.

Such method can be carried out with a measuring signal frequency generator having a frequency divider connected forwardly of the primary modulator and possessing a selectable divider ratio. The frequency divider is controlled by a control device which during the course of the stepwise change in the frequency of the measuring signal incrementally or stepwise reduces the frequency divider ratio by an integer jump factor whenever there is present a steady-state condition of the regulation system.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
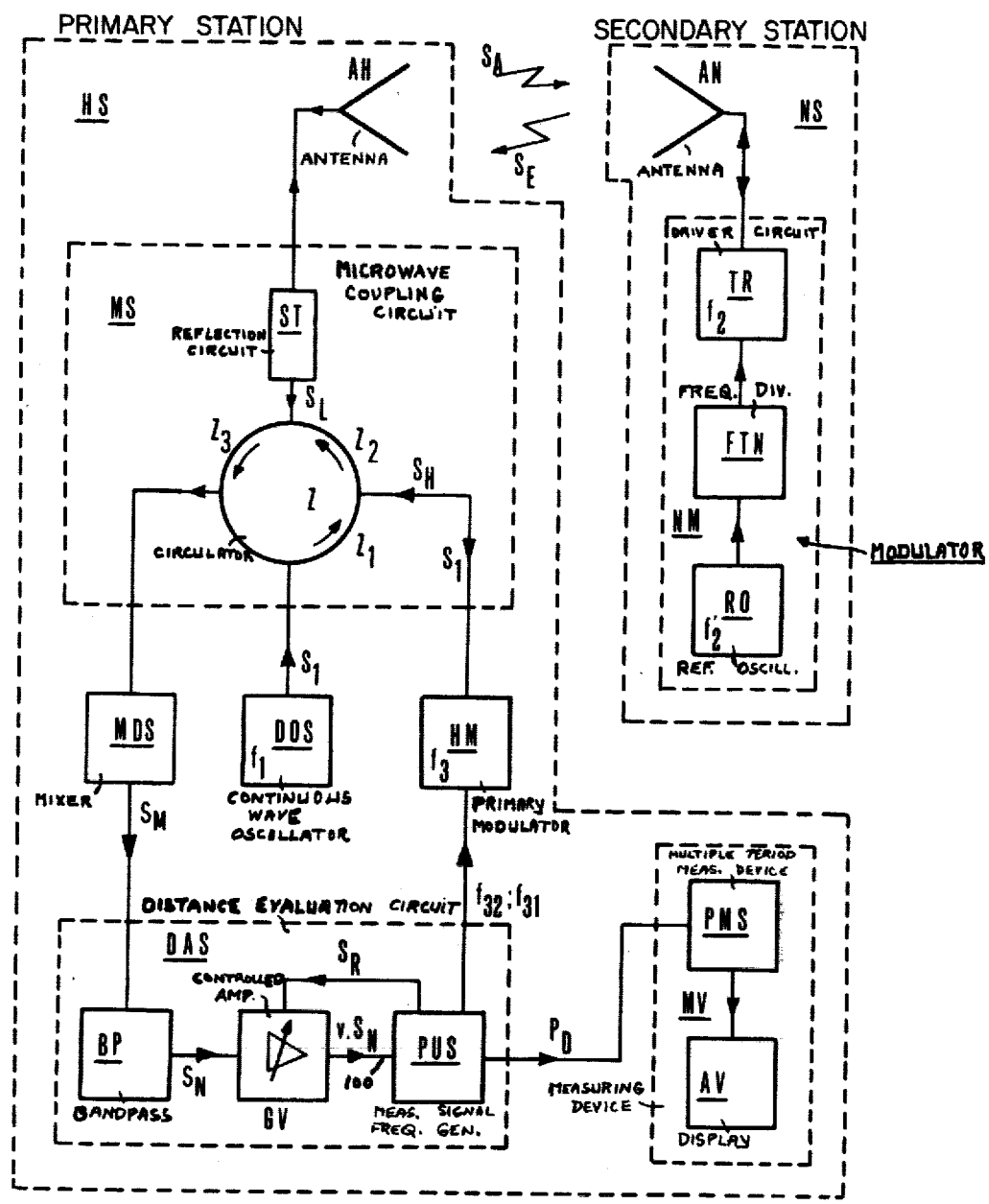
FIG. 1 is a block circuit diagram explaining the principles of the inventive distance measuring apparatus and useful for the practice of the method of the invention.

Describing now the drawings, the primary station HS of the distance measuring apparatus or system illustrated in FIG. 1 comprises a continuous or continuous wave oscillator DOS, for instance a semiconductor oscillator, which generates an unmodulated carrier signal $S_1$ at the frequency $f_1$ and the amplitude $S_{AO}$. This continuous wave oscillator DOS is connected by means of the first path $Z_1$ of a circulator Z of a microwave coupling circuit MS with a primary or main modulator HM. At the primary modulator HM there is for instance amplitude modulated the carrier signal $S_1$ by a periodic function p of the repetition frequency $f_3$ and delivered as the transmitter signal $S_H$ by means of the second path $Z_2$ of the circulator Z for transmission to the antenna AH.

The signal $S_A$ transmitted by the antenna AH of the primary station HS, and which signal can be expressed by the following equation:

$$S_A = S_H = S_1 (1 + p(2\pi f_3 t))$$
$$= S_{AO}(\cos 2\pi f_1 t) (1 + p(2\pi f_3 t))$$

wherein the symbol p represents a periodic function with the period $2\pi$, e.g.

$$p(2\pi f_3 t) = e \cos (2\pi f_3 t)$$

is transmitted by means of the reflector antenna AN of the secondary station NS to the modulator NM which modulates the signal with a phase modulation by a marking or marker signal frequency $f_2$ and returns such signal by means of the antenna AN back to the primary station HS. There is advantageously selected as the phase modulation at least approximately a single-sideband modulation. By undertaking such modulation at the secondary station there is rendered possible, during the measuring process at the primary station, in an advantageous and simple manner firstly separation of the useful signal reflected by the secondary station NS from the reflected disturbance signals generated by objects lying within the antenna radiation width, and secondly, to form an intermediate frequency with the marker signal frequency $f_2$ without any additional local oscillator, i.e. only by using the transmitter oscillator as the local oscillator.

With an ideal single-sideband modulation the phase continuously changes according to the following functions:

$$\phi_2(t) = \omega_2 t = 2\pi f_2 t$$

Figure 2:
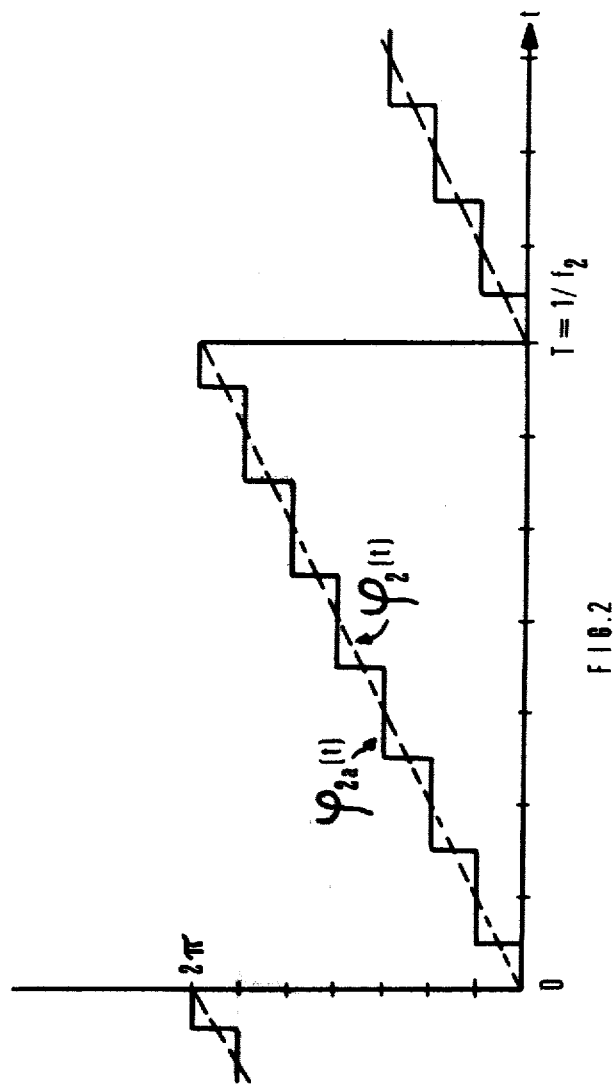
FIG. 2 graphically illustrates a step-like approximation of the phase function of an ideal, singlesideband modulation wherein the phase continuously changes according to the function $\phi_2(t) = 2\pi f_2 t$.

Hence, without having to tolerate any basic drawback for the distance measuring method there can be employed an appropriate approximation of such function. There is preferably used a much simpler to realize approximation according to FIG. 2, wherein the function $\phi_2(t)$ is approximated by a step-shaped function $\phi_{2a}(t)$ with the same period $1/f_2$, the last-mentioned function can be realized by quantitization steps. The modulator NM of the secondary station NS can be controlled for the purpose of obtaining a step function, for instance by means of a reference oscillator RO through the agency of a frequency divider FTN and a driver circuit TR which contains a combinational logic, a digital/analog converter and a driver.

The damped and single-sideband modulated signal $S_E$ which is transmitted by the reflector antenna AN and received by the antenna AH, and which signal can be expressed by the following equation:

$$S_E = S_{AO} r' a (\cos(2\pi f_1 t - \phi_2(t) - \phi_1))$$
$$(1 + p(2\pi f_3 t - \phi_3))$$

wherein the symbol r' designates the two-way attenuation over a radio link section and the symbol a designates the damping or attenuation at the secondary station NS by deviation from the ideal single-sideband modulation, contains, apart from the phase function $\phi_2(t)$ responsible for the single-sideband modulation, also the carrier phase $$\phi_1 = 4\pi f_1 d/c$$

and the modulation phase, i.e. the phase difference between the measuring signals of the received and transmitted signals.

$$\phi_3 = 4\pi f_3 d/c$$

wherein the symbol d represents the distance to be measured between the primary station HS and the secondary stations NS, and the symbol c represents the propagation velocity.

With ideal single-sideband modulation a=1. The signal can be additionally amplified at the secondary station NS, thereby increasing the range. The received signal $S_E$ arrives by means of the microwave coupling circuit MS together with a local oscillator signal $S_L$ at the mixer or mixer circuit MDS where there is formed the mixed product SM which can be expressed by the following equation:

$$SM = (S_L + S_E)^2 = S_L^2 + 2 S_L S_E + S_E^2$$

wherein, from its standardized cross product there can be obtained the desired useful signal $S_N$, which can be expressed by the following equation:

$$S_N = 2 S_L S_E / r \, S_{AO} =$$
$$= S_{Eo} Z_a (\phi_3) \cdot \cos (\phi_2(t) + \phi_1)$$

In the immediately foreoing equation $S_{Eo} = S_{AO} r' a$ designates the rated receiving amplitude, $Z_a(\phi_3) = 1 + R_p(\phi_3)$ represents the demodulation function for an amplitude-modulating primary modulator, and $R_p(\phi_3)$ designates the autocorrelation function of p, wherein for the above-assumed cosine-like periodic function $R_p$ can be expressed by the following equation:

$$R_p = (e^2/2) \cdot \cos \phi_3$$

The modulated carrier signal $S_1$ can be delivered by means of the second path or arm $Z_2$ of the circulator Z to a subsequently connected reflection location or circuit ST. A fraction r of the transmitted signal $S_H$ which is to be considered as the local oscillator and modulation phase reference signal $S_L = r \cdot S_H$ is reflected at the reflection location ST and arrives by means of the third path or arm $Z_3$ of the circulator Z at the mixer MDS, which for instance, may be a mixer diode circuit.

It should of course be understood that also other microwave circuits can be employed which produce a modulated signal, which is then radiated and proportionally transmitted to a mixer.

Instead of amplitude modulation of the carrier signal $S_1$, it is analogously possible to employ a phase modulation wherein:

$$S_A = S_{AO} \cos(2\pi f_1 t + p(2\pi f_3 t)); \text{ and}$$

$$S_N = S_{Eo} Z_{Ph}(\phi_3) \cos(\phi_2(t) + \phi_1)$$

in the foregoing, the function $$Z_{Ph}(\phi_3) = (R_{\cos p}(\phi_3) + R_{\sin p}(\phi_3))$$

serves as the demodulation function for a phase-modulating primary modulator, or $$Z_{Ph}(\phi_3) \approx 1 - R_p(O) + R_p(\phi_3),$$

wherein $/p/ << 1$ and
$R_{\cos p}$ = autocorrelation function of cos p, and
$R_{\sin p}$ = autocorrelation function of sin p.

Of course, there can be used for the generation of a useful signal $S_N$ according to the proposed method equally an arrangement which, in contrast to the heretofore described arrangement, delivers part of the unmodulated transmitter signal as a local oscillator signal to the mixer. The modulation signal which is to be considered as the phase reference signal then must not only modulate in the same manner the signal to be transmitted, but also the received signal. This can be preferably accomplished by means of a low reflection through-flow modulator serving as the primary modulator and connected forwardly of the antenna terminal. There then passes through the primary modulator both the wave to be transmitted and also the received wave. It can be easily demonstrated that also with such arrangement there prevails a useful signal $S_N$ of the previously derived form.

The useful signal $S_N$ is separated by a narrow bandbandpass filter BP from undesired mixed product signals, especially signals of the frequency $f_1$ and $f_3$ and noise signals, and delivered to a measuring signal frequency generator PUS. The measuring signal frequency PUS is provided at its input or input side 100 (FIG. 3) with an amplitude demodulator DEM which, for instance, with linear demodulation characteristic delivers from the useful signal $v.S_N$ which, for instance, has been amplified by means of a controlled amplifier GV by the gain v, the demodulated amplitude signal.

$$S_{DEM} = S_{Eo} v Z(\phi_3)$$

(wherein, $Z = Z_a$ and $Z = Z_{Ph}$ for amplitude modulation and phase modulation respectively). In order to avoid disturbance signals it is however preferred that the demodulator have a logarithmic characteristic.

Figure 4:
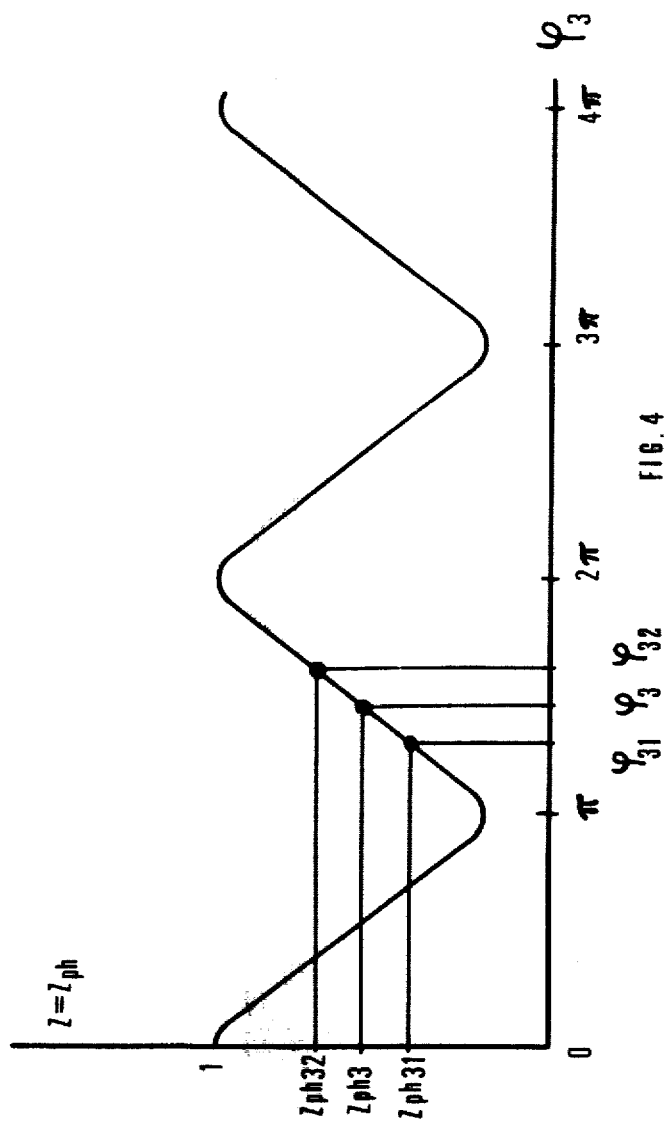
FIG. 4 graphically illustrates the typical course of the demodulation function $Z = Z_{ph}$ during squarewave phase modulation with finite edge steepness or slope.

The demodulation function $Z(\phi_3)$ is an even and periodic function of $\phi_3$, since it is composed of autocorrelation functions of functions of the periodic function $p(2\pi f_3 t)$. It depends upon the amplitude and the form of the function p as well as upon whether the primary modulator is a phase modulator or amplitude modulator. A typical form of $Z = Z_{Ph}$ for square-wave phase modulation with finite edge steepness in the primary modulator HM is shown in FIG. 4.

Figure 3:
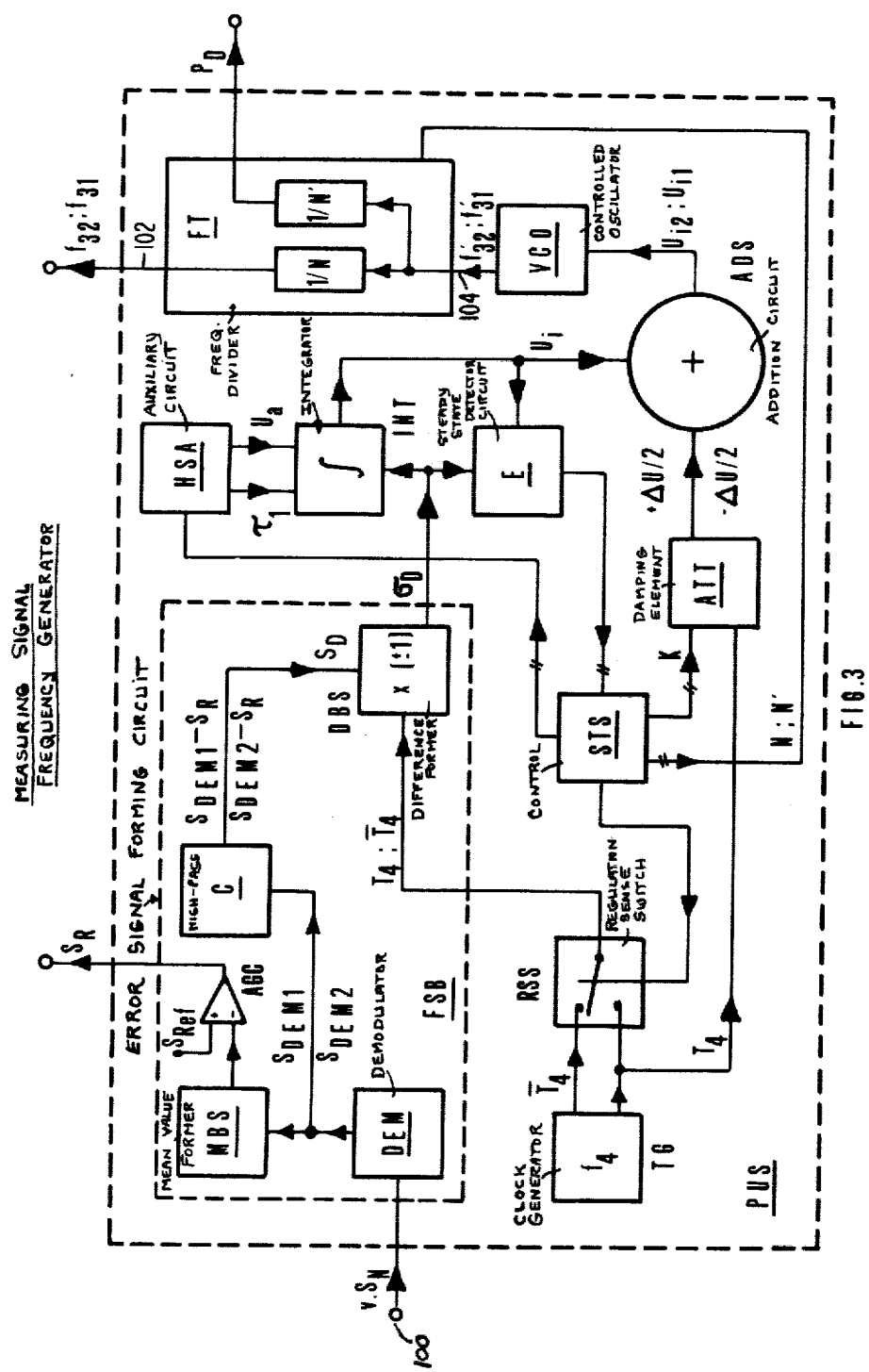
FIG. 3 is a block circuit diagram of a measuring signal frequency generator constructed as a programmed shift circuit.

In order to facilitate the explanation of the invention there previously was assumed that the measuring signal frequency $f_3$ and the measuring signal phase $\phi_3$ were constant as a function of time. However, there is provided at the measuring signal frequency generator PUS a controlled oscillator VCO which is controlled by a signal of the relatively low frequency $f_4$ from a modulation signal source, for instance a sine-wave oscillator, such that its output signal is frequency modulated. In FIG. 3 the measuring signal frequency generator is constructed for instance as a programmed shift circuit PUS in which the oscillator VCO is voltage controlled and the modulation signal source is a clock generator TG operating at the frequency $f_4$. Thus, the output signal is shifted or switched in the same cycle between the frequencies $f'_{32}$ and $f'_{31}$. The voltage controlled oscillator VCO can have an exponential characteristic, whereby the frequency ratio $f'_{32}/f'_{31}$ is at least approximately independent of the operating point of the voltage controlled oscillator. The measuring signal frequencies $f_{32} = f'_{32}/N$ and $f_{31} = f'_{31}/N$ alternately appearing in cycle at the output of the frequency divider FT with squarewave modulation are lower by the divider ratio N of the frequency divider FT which has been set by the control device STS and therefore shift the modulation phase between the values $$\phi_{32} = 4\pi f_{32}d/c \text{ and } \phi_{31} = 4\pi f_{31}d/c$$

Consequently, the argument of the periodic function Z is shifted (see FIG. 3). Hence, the demodulated amplitude $S_{DEM}$ alternately assumes the values $$S_{DEM\,1} = S_{Eo}\nu Z(\phi_{31}) \text{ and}$$

$$S_{DEM\,2} = S_{Eo}\nu Z(\phi_{32}).$$

The gain $\nu$, with automatic gain control due to feedback of the mean or average value signal $$S_R = (S_{DEM\,1} + S_{DEM\,2})/2$$

by the mean value formation circuit MBS is regulated such that there is set a standardized value from the mean value $S_R$, and which is maintained independent of the distance dependent-rated received amplitude $S_{Eo}$ of the signal arriving at the secondary station NS. The mean value formation circuit MBS can preferably essentially consist of a low-pass filter.

Thus, there can be formed by means of the high-pass filter C a difference signal $$S_D = U_o \cdot \sigma_D = U_o \cdot \frac{S_{DEM\,2} - S_{DEM\,1}}{S_{DEM\,2} + S_{DEM\,1}} = U_o \cdot \frac{Z(\phi_{32}) - Z(\phi_{31})}{Z(\phi_{32}) + Z(\phi_{31})}$$

in a difference formation circuit DBS, wherein $U_o$ constitutes the signal scale for $S_D$ and $\sigma_D$ of the standardized difference signal. The high-pass filter C can preferably comprise a coupling capacitor.

In order to form the difference signal $\pm S_D$ there is selectively employed by means of a regulation sine-wave switch RSS the square-wave signal $T_4$ for $+S_D$ or its inverted square-wave signal $\overline{T_4}$ for $-S_D$, delivered by the clock generator TG in order to thereby preferably control a multiplier stage or sign reversal or switching stage as the difference forming circuit DBS.

In order to simplify the understanding of the invention the standardized difference signal $\sigma_D$ will be represented as the function of the mean modulation phase $$\phi_3 = (\phi_{32} + \phi_{31}/2)$$

and the modulation phase jump or surge $$\Delta\phi_3 = \phi_{32} - \phi_{31}$$

in the form of $$\sigma_D = \sigma_D(\phi_3, \Delta\phi_3)$$

In order to increase the measuring accuracy, there is preferably delivered the difference signal to an inverting integrator INT having the time-constant $\tau_1$, and thus determined and integrated. The starting conditions at the integrator INT are defined by a signal $U_a$ delivered from an auxiliary circuit HSA, this signal $U_a$ being applied to the integrator INT in order to thereby generate the starting signal $$U_i = (-1/\tau_1)\int \pm S_D dt + U_a$$

In an addition circuit ADS there is added in cycle with the square-wave signal $T_4$ a square-wave signal having the peak values $+\Delta U/2$ and $-\Delta U/2$ and which signal is derived from the square-wave signal $T_4$, for instance by means of a damping or attenuation element ATT, so that at its output there appears a signal which has been switched in the same cycle between $U_{i1}$ and $U_{i2}$, wherein $(U_{i1} + U_{i2}/2) = U_i$ is defined as the mean or average value, and $U_{i2} - U_{i1} = \Delta U = 2kU_o$ is defined as the difference with the magnitudes k (relative shift stroke) and $U_o$ (signal scale). At the output 104 of the subsequently connected voltage controlled oscillator VCO, which preferably has an exponential characteristic, there appears for instance a signal which alternately possesses the frequency $f'_{32}$ during the duration of the clock pulse and the frequency $f'_{31}$ during the duration of the clock pulse-interpause, wherein $$(f'_{32} + f'_{31}/2) = f'_3 \approx f_3(\exp U_i/U_o)(1 + k^2/2) k << 1$$

is designated as the mean oscillator frequency and $$f'_{32} - f'_{31} = \Delta f'_3 \approx f'_3 \cdot 2k \; k << 1$$

is designated as the frequency jump at the oscillator. In corresponding manner there appears at the output 102 of the frequency divider FT a signal of the measuring signal frequency $f_{32}$ and $f_{31}$ during the duration of the clock pulse and the clock pulse-interpause or interval, respectively. In this regard, the following function $$(f_{32} + f_{31}/2) = f_3 = f'_3/N$$

constitutes the mean measuring signal frequency and $$(f_{32} - f_{31}/2) = \Delta f_3 \cdot 2k$$

constitutes the modulation frequency jump during the clock shift. The thus resultant modulation phases are $\phi_{32}$ for the clock pulse and $\phi_{31}$ for the clock pulse-intervals with the mean value $$\phi_3 = 84\pi d/c)f_3$$

and the phase jump $$\Delta\phi_3 = \phi_3 \cdot 2k$$

thus there is again given the standardized difference signal $\sigma_D=\sigma_D(\phi_3,\Delta\phi_3 I)$ and there is closed the signal circuit as the regulation circuit.

By substitution of the relationships for $f_3$ of the frequency divider FT for $f'_3$ of the voltage controlled oscillator VCO, and for $U_i$ of the integrator INT in the propagation equation for the mean modulation phase $\phi_3$, it is possible to express $\phi_3$ as a function of the difference signal $S_D$ as follows $$\phi_3 \approx \frac{4\pi}{c} \cdot d \cdot \frac{f_{3r}}{N} \left( \exp \frac{1}{U_o} \left( -\frac{1}{\tau_1} \pm S_D dt + U_a \right) \right) \left( 1 + \frac{k^2}{2} \right)$$

wherein the starting phase is given by $$\phi_{3a}=(4\pi/c)\cdot d\cdot f_{3a}$$

with the starting modulation frequency $$f_{3a}\approx(f_{3r}/N)(\exp U_a/U_o)(1+k^2/2)$$

After derivation of the equation for $\phi_3$ as a function of time there is derived the differential equation $$\frac{d\phi_3}{dt} \approx \frac{4\pi}{c} \cdot d \cdot \frac{f_{3r}}{N} \left( \exp \frac{1}{U_o} \left( -\frac{1}{\tau_1} \pm S_D dt + U_a \right) \right) \left( 1 + \frac{k^2}{2} \right) \cdot \frac{\mp S_D}{\tau_1 U_o}$$

which can be expressed in the following manner by substitution of the expression for $\phi_3$ and $S_D=U_o\sigma_D(\phi_3,\Delta\phi_3)$ in the form $$\frac{d\phi_3}{dt} = \mp \phi_3 \frac{\sigma_D(\phi_3 \cdot k)}{\tau_1}$$

wherein:

$$2k=(\Delta\phi_3/\phi_3)$$

and with the starting condition $$\phi_3=\phi_{3a}$$

For the standardized difference signal there is valid the following:

$$\sigma_D = \frac{Z(\phi_3 + k\phi_3) - Z(\phi_3 - k\phi_3)}{Z(\phi_3 + k\phi_3) + Z(\phi_3 - k\phi_3)}$$

Owing to the characteristics of Z as a $2\pi$ periodic linear function, there prevail the null positions of $\sigma_d$, required for the steady-state condition of the system for the mean steady-state modulation phases $\phi_{3e}$ with $$\sigma_D=0 \text{ for } \phi_3=\phi_{3e}=m\cdot\pi$$

and $m=0, 1, 2, 3\ldots$ (whole number ambiguity factor).

Depending upon the selection of the relative shift stroke k and the regulation sense, several of the null positions of $\sigma_D$ become stable, while other null positions constitute labile or unstable states of the regulation system for the modulation phase. By appropriately selecting this parameter and the starting modulation frequency $f_{3a}$ and the starting modulation phase $\phi_{3a}$, respectively, it is also possible to obtain for an unknown distance $d<d_{max}$, that the system builds-up to a certain desired first mean modulation phase $\phi_{3e1}$. For instance, there can be forced as the first steady-state condition $\phi_{3e1}=\pi$ and $m=m_1=1$, respectively, in that at the differential formation circuit there is selected the positive sign (or at the differential equation for $\phi_3$ the negative sign) and k can be selected for instance to amount to $k_1=\pi/2\cdot\phi_{3e1}=\frac{1}{2}$, and further that there is ensured fulfillment of the starting conditions $\phi_{3e1}<2\pi$ and $f_{3a}<c/2d_{max}$ by appropriate setting of the auxiliary circuit HSA for $U_a$ and the divider ratio N at the frequency divider FT. While maintaining the starting condition it is possible to incrementally reduce the divider ratio of the frequency divider FT until there is attained the desired steady-state condition of the system at $\phi_{3e1}$. The inventive method thus advantageously enables working, even with a large distance range, with a limited pulling range of for instance somewhat more than 2:1 of the voltage controlled oscillator VCO.

At the neighborhood of a steady-state phase $\phi_{3e}$ the dynamic of the regulation circuit can be derived by linearization of the function for the standardized difference signal $\sigma_D$ interpreted as the error magnitude. According to the differential equation for $\phi_3$ there is valid for the phase which builds-up exponentially as a function of time the following relationship:

$$\phi_3-\phi_{3e}=(\phi_{3a}-\phi_{3e})\exp=t/\tau$$

wherein $$\tau = \frac{\tau 1}{\phi_{3e}} \cdot \frac{1}{\frac{d\sigma_D}{d\phi_3}}\bigg|_{3\phi\ =\ \phi_{3e}}$$

constitutes the time-constant of the regulation system.

The condition expressed by the following relationship $$\phi_{3e}=m\cdot\pi=(4\pi/c)\cdot d\cdot f_{3e}$$

provides, with the steady-state phase $\phi_{3e}$ and thus equally the steady-state modulation frequency $f_{3e}$, the desired distance $$d=(c\cdot m/4f_{3e})$$

without any ambiguity from the steady-state mean modulation frequency $f_{3e}=f_{3e1}$, since the ambiguity factor m, as explained heretofore, can be forced for instance to amount to $m_1=1$.

With this first build-up of the regulation circuit there is thus completed an unambiguous coarse distance measurement.

The determination of the distance can be accomplished, for instance, by division of the measuring signal factor or scale factor $$cm/4 = m \cdot 74.93 \text{ MHz} \cdot \text{Meter}$$

by the first, mean steady-state measuring signal frequency $f_{3e1}$. Since, however, according to the inventive method the distance can be more exactly determined by carrying out subsequent fine measurements, it is unnecessary during the coarse measurement to carry out a distance evaluation. The determined coarse distance therefore is present only in the form of the first steady-state mean measuring signal frequency $f_{3e1}$ and the forced ambiguity factor $m = m_1$.

Now when performing a fine distance measurement it is necessary for the purpose of increasing the accuracy to attain the condition for a steady-state phase with a measuring signal frequency which is increased in relation to $f_{3e1}$ and a correspondingly higher ambiguity by factor m. By virtue of the inventive frequency jump technique this is possible according to the following considerations, without any loss in the unambiguousness. For a given distance, there exists proportionality between the possible ambiguity factors m and the possible steady-state measuring signal frequencies $f_{3e}$ according to the following equation:

$$m = (4/c) \cdot d \cdot f_{3e}$$

On the other hand, while taking into consideration the whole number of integer characteristic of the value series for m, each integer multiple q of a first ambiguity factor $m_1$ is likewise a whole number or integer, and thus an ambiguity factor which is possible for a q-fold finer measurement, which possible ambiguity factor can be expressed as follows:

$$m_2 = q \cdot m_1 \quad q > 1 \quad (q = \text{integer})$$

It therefore follows that equally each further mean measuring signal frequency $$f_3 = q \cdot f_{3e1} = f_{3e2}$$

can be a measuring signal frequency $f_{3e2}$ capable of assuming a steady-state condition if it is greater by the integer factor q in relation to the measuring signal frequency $f_{3e1}$ obtained for the course measurement. This fact is taken into account with the inventive frequency jump technique inasmuch as after build-up of the regulation circuit to a first mean measuring signal frequency $f_{3e1}$ there is increased in a jump-like or sudden fashion the mean measuring signal frequency by an exactly integer jump factor q. If this frequency jump is advantageously carried out by a simple switching or shifting of the divider ratio of the programmable frequency divider FT from $N = N_1$ to $N_2 = N_1/q$ in the steady-state condition of the regulation system—which frequency ratio shift is triggered by the control device STS—then there is obtained as a first advantage that the frequency pulling range of the voltage controlled oscillator VCO, which is merely relatively small in relation to the total measuring signal frequency range, for instance somewhat more than 2:1, is also adequate for the fine distance measuring. As a second advantage, the system, directly after the shifting or switching operation, due to the storage action of the integrator controlling the voltage controlled oscillator VCO, is located at least in the proximity of a new steady-state condition having the means frequency $f_{3e2}$. Since in reality the first steady-state frequency $f_{3e1}$ can deviate somewhat from its reference value $f'_{3e1}$ owing to the limited accuracy of the coarse distance measurement, the system following the frequency shifting or switching operation, must be allowed a certain transient or build-up time, in order to eliminate the deviation of the frequency of the voltage controlled oscillator VCO from its reference value which is caused due to the q-fold increased relative measuring accuracy. Too large deviation would be associated with the danger of locking of the regulation circuit at the neighboring stable points $m_2 \pm 1$ and is thus to be avoided by selecting the jump $q < q_{max}$, wherein there must hold true the following relationship $$q_{max} < \frac{1}{2 \cdot m_1 \cdot (\text{rel. error of } f_{3e1})}$$

With the jump $q = 2$ there is obtained for instance the greatest possible security against false locking of the regulation system, but on the other hand there can be achieved only a small gain in the accuracy by the factor 2.

With the now attained steady-state condition of the regulation circuit there is completed a first fine distance measurement and the q-fold more exact distance value can be derived from the mean steady-state measuring signal frequency $f_{3e2}$ according to the equation $$d = (c \cdot m_2 / 4 f_{3e2})$$

with the forced and known ambiguity factor $$m_2 = q \cdot m_1$$

The relative accuracy of this first fine distance measurement is determined by the q-fold increased relative accuracy of the measuring signal frequency $f_{3e2}$, whereas now the coarse measurement only still is decisive for the determination or forcing, as the case may be, of the integer ambiguity factor $m_2$.

Generally, however, the measuring accuracy is previously increased by a further frequency jump operation, which if necessary can be carried out a number of times, with the same or different frequency jumps $q_i$ until there has been attained the desired magnitude of the mean measuring signal frequency, in boundary cases with turned-off frequency divider FT, the frequency of the voltage controlled oscillator VCO itself. With the last build-up of the regulation circuit there is completed the fine distance measurement and the determination of the distance can be initiated based upon the last mean measuring signal frequency $f_{3en}$. It can be carried out, for instance, by division of the measuring signal factor or a scale factor $$cm_n/4 = m_n \cdot 74.93 \text{ MHz} \cdot \text{Meter}$$

with the last mean built-up or steady-state measuring signal frequency $f_{3en}$, wherein $$m_n = m_1 \cdot q_1 \cdot q_2 \cdot q_3 \ldots q_i \ldots q_n$$

constitutes the forced and thus known ambiguity factor and $q_1 \ldots q_n$ constitutes the forced jump factors which in each case have been employed.

Further, it is to be observed that with sufficiently long measuring time a frequency measuring device operating according to a counter principle can advantageously readily determine the mean value $f_{3en}$ between the shifted measuring signal frequencies $f_{3el}(1+k)$ and $f_{3en}(1-k)$, if the keying ratio for the frequency shift is symmetrical, i.e. selected to amount to 1:1. Since, however, the division or the formation of the reciprocal value is complicated, the digital determination of the distance in meters can be advantageously accomplished by a multiple-period measurement according to the start-stop counter principle by means of a clock frequency $f_m$, according to the following equation:

$$d_m = (1/\text{Meter}) \cdot d = (m_n/M) \cdot f_m (MT_{3en})$$

wherein $$f_m = (c/4\text{Meter}) = 74.93 \text{ MHz}$$

constitutes "meter frequency scale" and the clock frequency for the multiple-period measurement, and wherein $$T_{3en} = 1/f_{3en}$$

constitutes the period duration of the mean steady-state measuring signal frequency $f_{3en}$ and the symbol M the number of determined periods.

Since owing to the shift of the measuring signal frequency there is neither physically available the mean measuring signal frequency $f_{3en}$ nor its period $T_{3en}$, there is to be determined by means of a multiple-period measurement with symmetrical shift or switching cycle the mean period $T_{3em}$ between both the measuring signal frequencies $$T_{3em} = \tfrac{1}{2}\left(\frac{1}{f_{3en}(1+k)} + \frac{1}{f_{3en}(1-k)}\right) = \frac{T_{3en}}{1-k^2}$$

which differs by the factor $(1-k^2)$ from the period $T_{3en}$ of the mean measuring signal frequency. The determination of the distance can then be readily carried out by means of the mean period $T_{3em}$ instead of $T_{3en}$ if the clock frequency $f_m$ is corrected according to the following equation to the value $$f'_m = f_m(1-k^2)$$

or with the switching cycle there is employed, instead of a symmetrical keying ratio, one which can be expressed as $(1+k):(1-k)$ for the weighting correction during the formation of $T_{3en}$ as the mean value. In the following explanation it will be, however, seen that the frequency shift stroke k which is employed for the finest measurement generally must be chosen to be so small that in practice the multiple-period measurement can be carried out with the uncorrected clock frequency $f_m$ or symmetrical switching cycle, respectively, without having to accept any significant losses in accuracy for the determination of the distance.

In accordance with this frequency jump method, by means of the control device STS, there is advantageously switched during the switching time, apart from the measuring signal frequency, equally the frequency shift stroke k, the time-constant $\tau_1$ of the integrator INT and possibly the regulation sense of the regulation circuit (regulation sense switch RSS). There is attained an at least approximately desired maximum slope $d\sigma_D/d\phi_3$ for $\phi_3=\phi_{3e}$ of the standardized difference signal $\sigma_D$, and which slope is independent of the ambiguity factor m, in the event $\Delta\phi_3=\pi$, and thus, $$k = (\Delta\phi_3/2\phi_3) = (\pi/2\phi_{3e})$$

With $\phi_{3e}=m\cdot\pi$, there is thus satisfied the relationship $$k = \tfrac{1}{2} m.$$

The frequency shift stroke k thus must be reduced, with increasing ambiguity factor m, by the jump factor.

The time-constant of the integrator is likewise linked with the steady-state modulation phase $\phi_{3e}$:

$$\tau_1 = \tau \cdot \phi_{3e} \cdot (d\sigma_D/d\phi_3) | \phi_3 = \phi_{3e}$$

wherein when $\phi_{3e} = m\cdot\pi$ there is valid
$$\tau_1 = \tau \cdot m \cdot \pi \cdot (d\sigma_D/d\phi_3) | \phi_3 = \phi_{3e}.$$

If the time-constant $\tau$ of the regulation circuit is not dependent upon the ambiguity factor m, then it is also necessary to increase by means of the control device STS the integrator time-constant $\tau_1$ with increasing ambiguity factor m likewise by the momentary jump factor q.

Finally, with the uneven values of the ambiguity factor m, the regulation sense must be chosen to be different then for the even values by means of the control device STS, in order to avoid the unstable equilibrium condition of the regulation circuit.

The control of the auxiliary circuit HSA for the starting condition $U_a$ and the integration time-constant $\tau_1$, the regulation sense switch RSS, the frequency divider FT, as well as the damping or attenuation element ATT for the frequency shift stroke k, is accomplished automatically by means of the central control device STS as a function of a circuit E which is capable of detecting the presence of a steady-state condition of the regulation system in accordance with a sequentially, relatively rapidly running program and as a function of the jump-like increasing ambiguity factor.

The control or central control device STS comprises a microprocessor by means of which there can be programmed the parameters of the regulation circuit, i.e. the starting conditions of the integrator INT, the divider ratio N,N' of the frequency divider FT, the regulation sense of the regulation circuit by means of the regulation sense switch RSS, and the damping of the attenuation element ATT during the course of the distance measurement. The regulation operation of such regulation circuit is to be distinguished from the programming by the control device STS. The regulation circuit is designed such that the mean phase $\phi_3$ assumes a steady-state condition at a predetermined value $\phi_3 = m\cdot\pi$, provided the control device STS, during the course of the distance measurement, ensures for the setting of the parameter of such regulation circuit.

Since the mean phase $\phi_3$, the frequency f3 and the distance d must satisfy the condition $$d = (c/4\pi) \cdot (\phi_3/f3)$$

wherein, $(c/4\pi)$ can be assumed to be constant, the frequency f3 will automatically adjust itself, due to the regulation operation, after there has been obtained a stable or steady-state condition. The steady-state condition is achieved in the following manner:

In FIG. 3 the expression $\phi_D$ at the output of the error signal forming circuit FSB is not a signal as such, rather only an interesting parameter of the signal which is actually present at such output. After the highpass filter C (FIG. 3) there is present a signal which sequentially consists of two signal parts. In the multiplier stage DBS functioning as a difference forming circuit, there is however multiplied the instantaneous values of its input signals. The parameter $\sigma_D$ contained in the output signal of the multiplier stage DBS appears as the difference signal $\sigma_D$ following a mean average formation, which either occurs in an optional low-pass filter ATP for mean value forming (FIG. 5) or inherently in the subsequently connected integrator INT (FIG. 3). The standardized difference signal $\sigma_D$ thus constitutes a mean value of the weighted two signal parts at the output of the high-pass filter C.

At the measuring signal frequency generator PUS (FIG. 3) the parameter $\sigma_D$ constitutes a measure for the deviation of the phase from a predetermined value (e.g. =0). As long as $\sigma_D \neq 0$ the voltage Ui changes, and consequently, also the mean frequency f3. When the mean value of $\sigma_D$ reaches the value 0, then the mean frequency f3 remains constant and, as apparent from the equation $d = (c/4\pi) \cdot \phi 3/f3$, constitutes a measure for the distance. From the condition $\sigma_D = 0$ there follows $$\frac{d\phi 3}{dt} = \mp \phi 3 \frac{\sigma_D(\phi 3 \cdot k)}{\tau 1} = 0$$

and therefore $\phi_3$ = constant.

Since the mean phase $\phi_3 = m \cdot \pi$ has a predetermined value, it is only necessary to measure the frequency f3 for determining the distance d. Since the distance d is proportional to 1/f3, it is however more convenient to determine the distance by measuring the reciprocal value 1/f3 of the frequency, i.e. the period duration 1/f3. This measurement can be accomplished with a conventional measuring device MV for the measurement of periods. This measuring device MV, shown in FIG. 1, can be constituted for instance by a commercially available electronic counter model HP 5300 A/B having period average capability, module type HP 5302A of the well known firm Hewlett Packard. The multiple period measuring device PMS then constitutes the measuring part of the module HP 5302A and measurement display device AV the display part HP 5300 A/B.

Figure 6:
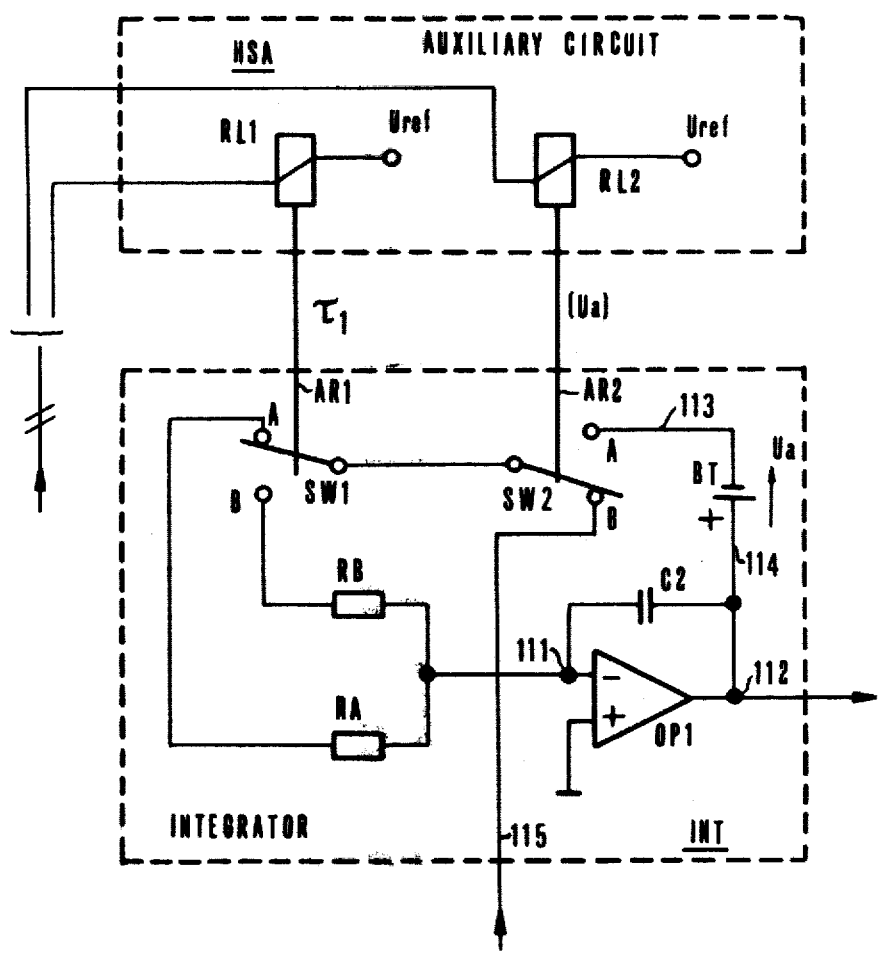
FIG. 6 is a circuit diagram showing details of a possible construction of the auxiliary circuit used in the arrangement of measuring signal frequency generator of FIG. 3.

In FIG. 6 there is shown an example for realizing the auxiliary circuit HSA while employing integrator INT. The auxiliary circuit HSA has two relay coils RL1 and RL2, each of which can actuate a relay switch SW1 and SW2 in the integrator INT by means of respective armature AR1 and AR2. Additionally, the integrator INT contains an operational amplifier OP1, the inverting input 111 of which is connected by means of a resistor RA with the connection or pole A and by means of a resistor RB with the connection or pole B of the relay switch SW1.

The inverting input 111 and the output 112 of the operational amplifier OP1 are connected with one another by means of a capacitor C2, and the output 112 of the operational amplifier OP1 at the same time constitutes the output of the integrator INT. The connection or pole A of the relay switch SW2 is coupled with the negative terminal 113 of a battery BT, the positive terminal 114 of which is connected with the output of the operational amplifier OP1. The connection or pole B of the relay switch SW2 is also the input terminal 115 of the integrator INT.

The auxiliary circuit HSA functions in the following manner: by means of the control signals of the control device STS it is possible to actuate the relay switch as SW1 and SW2 by means of the relay coils RL1 and RL2. When the relay switches SW1 and SW2 are in the position A, then there is adjusted by means of the voltage Ua the starting condition independent of the position of the relay switch SW1. When the relay switch SW2 is in the position B and the relay switch SW1 is in the position A, then the integrator INT operates with the time constant $\tau 1 = \tau A = R_A \cdot C_2$. When both relay switches SW1 and SW2 are in the position B then the integrator INT operates with the time constant $\tau 1 = \tau B = R_B \cdot C_2$. There also can be provided a number of relays which render possible operating with further time constants and starting conditions.

The circuit E decides whether a steady-state condition of the regulation system is present or not. The circuit E therefore can comprise a first comparator 1, i.e. a three range-threshold value switch DSW defining a window discriminator, as the same has been shown in FIG. 7. Such window discriminators consist of, for instance, two comparators OP2, OP3 and an AND-gate GT1. The reference voltages or potentials UR1 and UR2 correspond to tolerance values at the region of null, since at the steady-state condition $\sigma_D$ amounts to null at the boundary case. This three range-threshold value switch delivers a signal x=1, when there has been attained a steady-state condition, i.e. when UR2 < $\sigma_D$ < UR1, otherwise it delivers a signal x=0. In the circuit E there is additionally provided a further three range-threshold value switch functioning as a comparator KS, and which delivers a signal y=1 when the voltage Ui has reached a certain threshold value. This comparator KS likewise contains two operational amplifiers OP4 and OP5, the output signals of which are linked by means of a NAND-gate GT2.

When the signal y=1, then the control device STS must program both divider ratios N and N' the same for so long, i.e. reduce such stepwise at the same time for so long, in order to increase the frequency f3, until there has been reached the first steady-state condition of the voltage controlled oscillator VCO, i.e. the regulation circuit. Thus, there are realized for the signals x and y the values y=0 and x=1 and the control device STS must only reduce the divider ratio N while maintaining fixed the divider ratio N' until N=N min. When x=0 and y=0, then the control device must wait until either x=1 or y=1. Thus, the conditions x=1 and y=1 cannot occur simultaneously, because the voltage Ui cannot simultaneously attain a threshold value and the value null. The course of such process has been shown in the flow chart of FIG. 8. As to such FIG. 8, the following legends have the following significance:

1 start

2

RSS set
$\tau 1$ set
k set
wait
Ua shut off

3 steady-state condition of regulation circuit?
(x = 1)?

4

N lower
N' leave
RSS new setting
τ1 new setting
k new setting

5

N = N min.?

6

Ui Extreme?
(y = 1)?

7 wait

8

N,N' lower
RSS set
τ1 new setting
k new setting

9 measure the period duration

10 compute into distance

11 end

Figure 7:
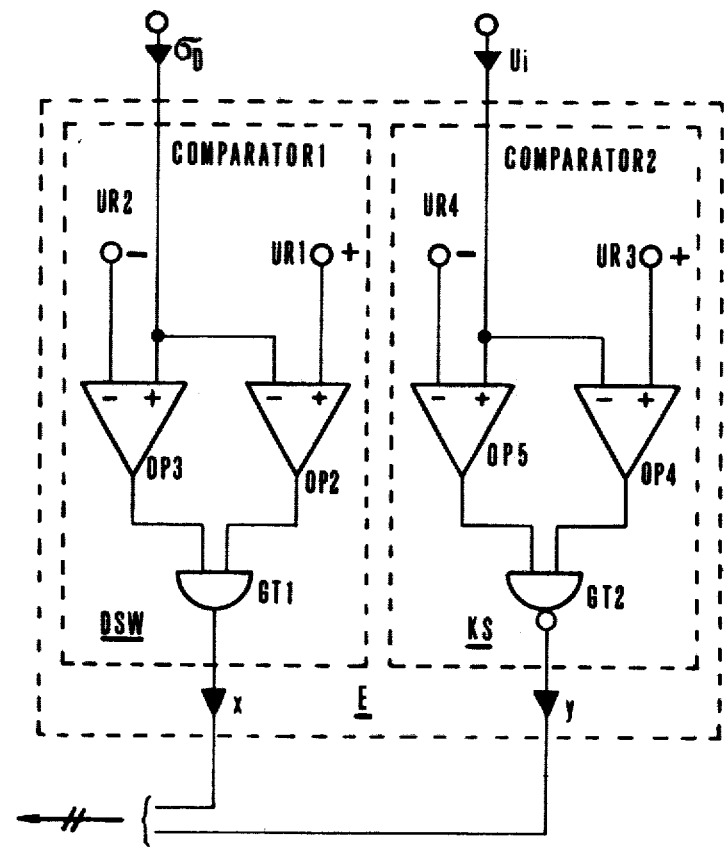
FIG. 7 is a circuit diagram of a possible configuration of the steady-state detector circuit used in the arrangement of measuring signal frequency generator of FIG. 3.
Figure 8:
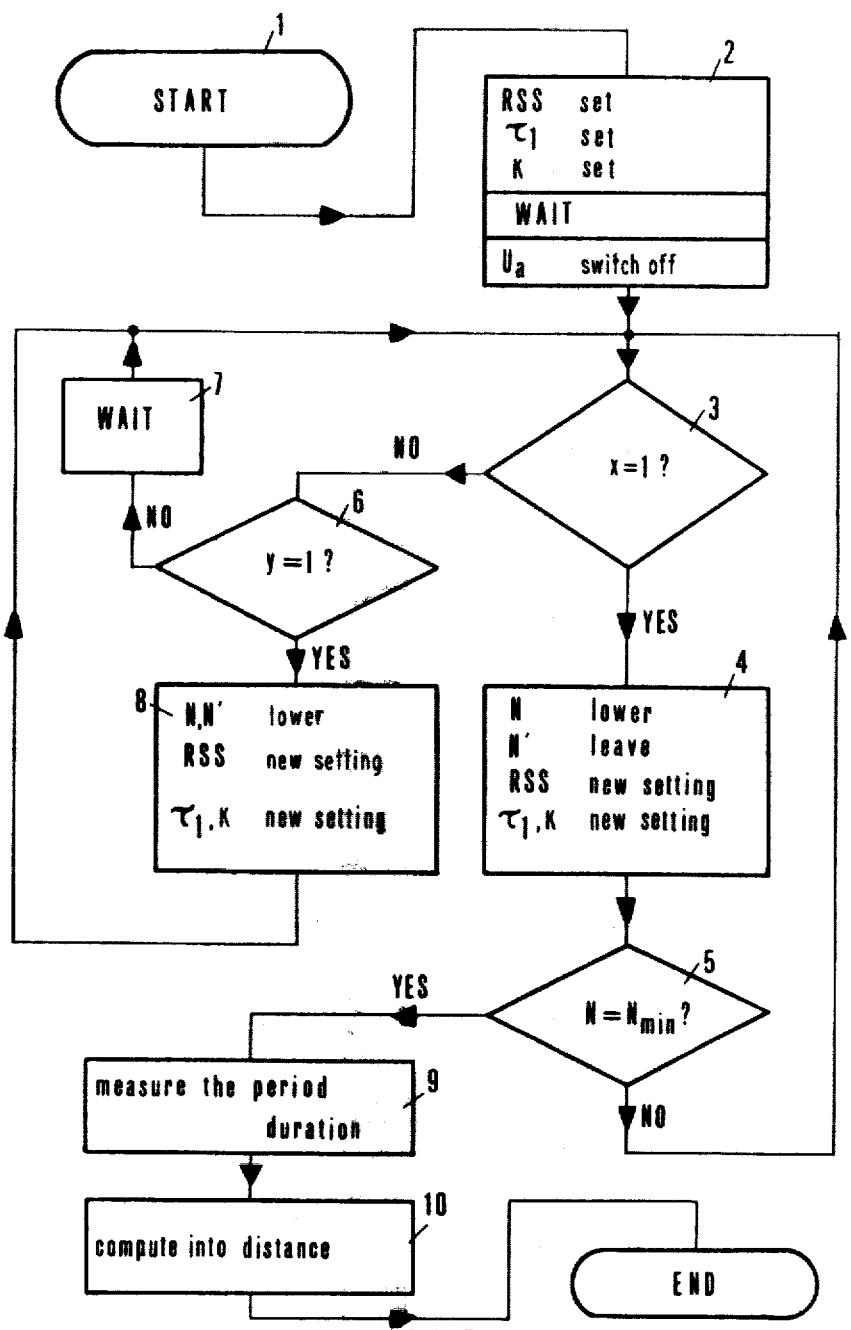
FIG. 8 is a flow chart serving to explain the invention.

The flow diagram of FIG. 8 shows the 10 operations which are required for distance measurement, several of the operations being carried out a number of times. The start of a measurement is triggered, for example, by the aid of a start key or a start button (first operation). Thereafter (second operation), the relay switches SW1 and SW2 are switched into position A (FIG. 6), the regulation sine-wave switch RSS (FIG. 3) is brought into one of its positions and the attenuator ATT (FIG. 3) is set at a starting value. Below these conditions, the integrator begins to build up until it has reached a starting value Ua. In this regard, a predetermined waiting time must be taken into account. After this time, the starting value Ua is switched off, i.e., the relay switch SW2 (FIG. 6) is switched to the position B. By means of the third operation, x = 1 or x = 0 is checked; this is accomplished with the aid of the circuit E (FIG. 7). If x = 1, then the fourth operation is performed; otherwise, the sixth operation is performed. During the fourth operation, the divider ratio N of the first output is reduced by one stage while maintaining the divider ratio N' of the second output of the frequency divider FT (FIG. 3). The regulation sine-wave switch RSS is initially switched before the loop begins. The values of the parameters T1 and K can be newly set within the loop, wherein it is to be observed that, in practice, the switch SW1 can assume a number of positions A, B, C . . . , such different connections over a number of resistances RA, RB, RC . . . can be established. The fifth operation delivers the command to repeat the third operation for such length of time until the divider ratio N has attained the smallest value. If this is the case, then the operations 9 and 10 are carried out, i.e., the period duration is measured and converted into a distance, and the process is completed. If the decision element E (FIG. 6) delivers a signal x = 0, then the operation 6 directly follows the operation 3. With the operation 6, it is determined whether y = 1 or y = 0. If y = 0, then, according to a prescribed waiting time (operation 7), operation 3 is repeated. On the other hand, if y = 1, then both divider ratios are reduced and the new setting of the regulation sine-wave switch or regulation sense switch means RSS and the parameter T1 and K are carried out during the fourth operation; only then is operation 3 repeated. In this respect, it should be further noted that the divider ratios N, N' during the operation 2, or otherwise, for instance, after the operation 9 or 10, can be switched to their maximum value in preparation for the next measurement. The position of the regulation sense switch means RSS can optionally be chosen during the operation 2 (cf FIG. 4). It is recommended, however, that during operation 2, the regulation sine-wave or regulation sense switch means RSS be adjusted such that a minimum in the curve is obtained (FIG. 4) and then all other operations are carried out with the regulation sense switch means switched into the other position, i.e., at a maximum.

Continuing, in order to simplify construction of the frequency divider FT, the jumps are preferably selected as integer powers of 2. This renders possible simple realization of a symmetrical shift ratio at the output of the frequency divider FT, independent of the programmed frequency divider ratio N, and thus also at the input of the primary modulator, whereby advantageously the periodic function p likewise becomes a symmetrical square-wave function with the exception of the switching transients.

Since the ambiguity factor of the fine distance measuring according to the inventive method is forced, it can be determined at the central control device, e.g., by counting the number of necessary jumps or by comparing the stored frequency divider ratio $N_1$, present during the first steady-state condition (course measurement) with the frequency divider ratio $N_2$ for the fine distance measurement. This relatively complicated determination of the ambiguity factor can be avoided according to a further manifestation of the invention by using a frequency divider FT having two individually programmable outputs, wherein one such output constitutes the previously mentioned output by means of which there is controlled the output signal of the primary modulator HM. The second output leads to the input of the multiple-period measuring device PMS. Both of the frequency divider ratios N and N' are similarly programmed by the central control device STS for such length of time until there has occurred the first steady-state condition of the voltage controlled oscillator VCO during the coarse distance measurement. During the subsequent performance of the measuring signal-frequency jumps there is only reduced the frequency divider ratio N of the first output while maintaining the frequency divider ratio N' of the second output. During the fine distance measurement there thus is similarly present at the input of the multiple-period measuring device PMS the frequency $f_{3el}$. There is determined therefrom the distance with the knowledge of $m_l$ without direct determination of $m_n$, as during the coarse distance measurement, however with the accuracy of the fine distance measurement, since $f_{3el}$ then exactly assumes the value $f'_{3el}$, wherein:

$$f_{3el} = f_{3en} \cdot (m_1/m_n)$$

The determination of the distance is carried out according to the equation for the multiple-period measurement $$d_m = m_1/M \cdot f_m(M \cdot T'_{3el})$$

with the aid of the frequency $$f'_{3el} = 1/T'_{3el}$$

which is present at the second output of the frequency divider FT upon reaching the steady-state condition during the fine distance measurement. The ambiguity factor $m_n$ for the fine distance measurement here no longer occurs, since it has already been correctly taken into account by the frequency divider ratio N' for the second output of the frequency divider FT and which has been stored during the coarse distance measurement. The fixed set and one selected ambiguity factor $m_1$ for the coarse distance measurement, and which is independent of the distance, and the number of periods M which are to be averaged or meaned is therefore easily taken into account by fixed or programmable frequency divider ratios within the multiple-period measuring device PMS during the distance determination. As previously explained, the multiple period-measuring device PMS of the measuring means or device MV further contains a distance measurement-display device AV connected with the multiple period-measuring device PMS.

Since the frequency shift modulates the processed amplitude of the useful signal, there appear at the carrier of the useful signal for the marker signal frequency $f_2$ sidebands at the spacing of the clock frequency $f_4$ and its harmonics. If the amplitude modulation with the clock frequency $f_4$ is to be processed at the receiver, then at least the first sidebands of the clock frequency must pass the bandpass filter. Hence, the band width of the filter must amount to at least $2f_4$. The noise power at the receiver output, and thus the static fluctuations of an evaluated distance for a given measuring time interval $M \cdot T_{3el}$ and given rated receiving signal amplitude $S_{Eo}$ are thus that much greater the higher there is selected the clock frequency $f_4$. Therefore, to obtain a high system range it is necessary to select as small as possible the clock frequency and filter band width, but however such must be greater than the reciprocal value of the measuring time interval, otherwise there cannot be evaluated at least one respective half of a complete cycle.

The lower the selection of the clock frequency $f_4$ that much greater is the disturbance of the random fluctuations of the radio link damping r' during the distance determination, since its proportion increases in the direction of the low frequencies, so that the selection of a clock frequency which is too low can in reality cause a reduction in the range.

Yet, it is possible to eliminate this drawback by an arrangement for the signal evaluation which is superior to that of FIG. 3. Such arrangement, which avoids the use of a rectifying demodulator DEM and can be realized, for instance, by resorting to the use of a so-called matchfilter or a synchronous demodulator, as shown in the system design of FIG. 5, also can be employed with the selection of a relatively high clock frequency $f_4$ of a noise band width which may be smaller then $2f_4$, and only takes into account the spectral width of the useful signal owing to fluctuations of the carrier phase $\phi_1(t)$.

With this arrangement there is connected after the amplifier GV a second bandpass filter BP2 having a smaller band width $<2f_4$ which separates the carrier signal at the frequency $f_2$ from noise signals and the sidebands. By means of this carrier signal there is synchronized a voltage controlled oscillator VCO2 operating at the frequency $f_2$ by means of a phase-locked loop PLL. The phase-locked loop PLL contains a 90°-phase shifter PHS and a multiplier MU1 which delivers from the filtered carrier signal and the 90°-phase shifted voltage controlled oscillator-signal as the phase detector, a control signal which controls the oscillator VCO2 by means of the low pass filter TP1. On the one hand, the multiplier DEM produces by means of the mean forming circuit MBS the mean value signal for regulation of the amplifier GV and, on the other hand, by means of the high-pass filter C the demodulated amplitude signal. The difference signal $\sigma_D$ is obtained by multiplication of the modulation signal by the clock signal $T_4$ at the frequency $f_4$ by means of the multiplier DBS following the mean value formation in the low pass filter ATP. The noise band width can be, therefore, chosen to be smaller than the band width of the first bandpass filter BP, so that the clock frequency determinative of the band width of the bandpass filter BP can be selected to be relatively high without any disadvantage as concerns the range. The function of the low pass filter ATP can also be assumed by the integrator, by means of which there is further processed, according to the inventive method, the difference signal $\sigma_D$.

Figure 5:
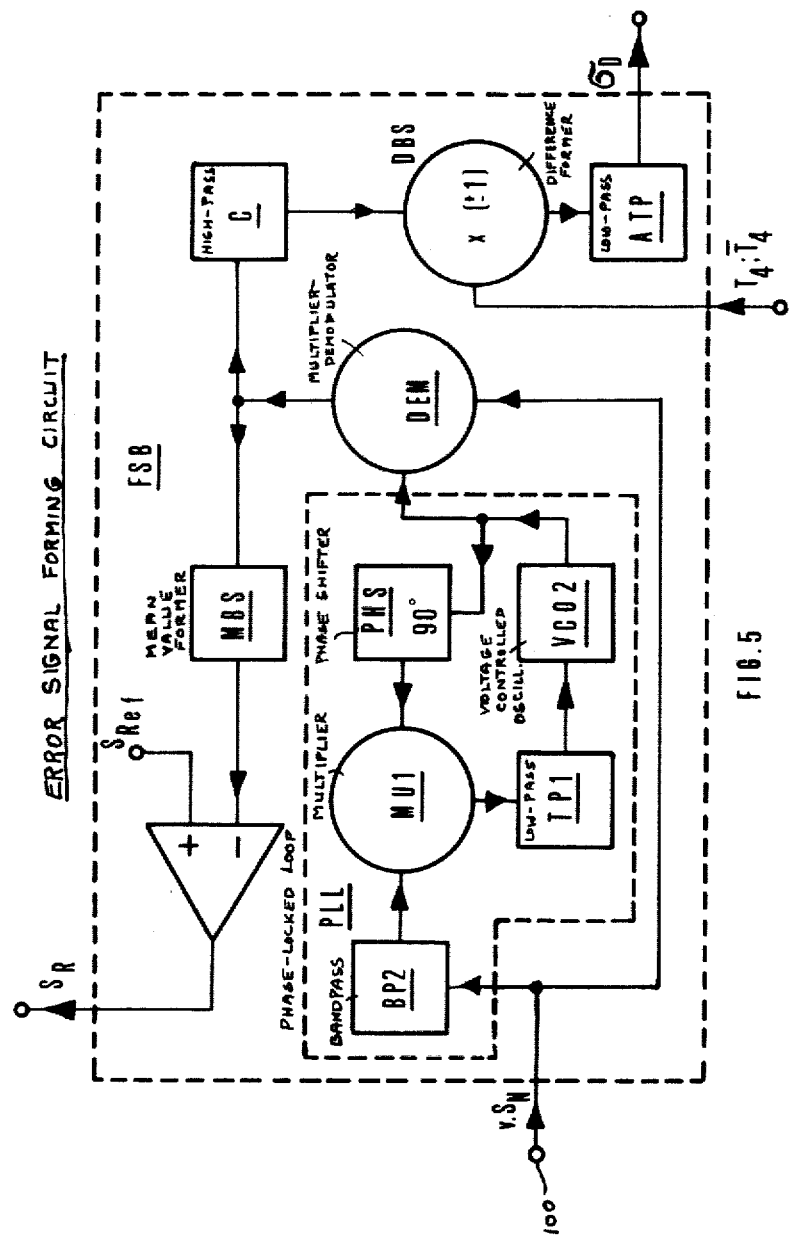
FIG. 5 is a block circuit diagram of a variant embodiment of the fault or error signal-formation circuit of the measuring signal frequency generator of FIG. 3.

With the arrangement of FIG. 5, it is possible for the purpose of enhancing the operational capability of the distance measuring device or system at selectively different channels, which differ from one another by virtue of their operating frequency, for distinguishing between different secondary stations by means of respective different fixed marker signal frequencies $f_2$, to program the midband frequency of the bandpass filter BP2 and the midfrequency of the voltage controlled oscillator VCO2 at the corresponding channel-marker signal frequency. In this way it is possible with only slight increased equipment expenditure to interrogate in succession from the primary station the distance to a number of simultaneously operated secondary stations.

There also can be provided at the secondary station NS a resonator for producing the marker signal modulation by a mechanical oscillatory movement at the marker signal frequency $f_2$.

With a fixed and relatively low clock frequency $f_4$ it is possible, on the other hand, for there to be present a system measuring error because the number of clock pulses and pauses or intervals taken into account during forming of the mean value, in the worst case, can differ by one from one another. It can be demonstrated that the error resulting therefrom amounts to a maximum for the distance evaluation as indicated by the following equation:

$$\pm \Delta d_{max} = c/16 \cdot f_{3el} \cdot h = c/16 \cdot f_4 \cdot g$$

wherein:

$$h = f_{3el}/M \cdot f_4 = f_{3en}/g \cdot f_4$$

constitutes the number of averaged or meaned cycles during the measuring time intervals, and $$g = m_n \cdot M / m_1$$

represents a factor independent of $m_n$ for measuring time intervals which are independent of $m_n$. This system error is generally negligibly small, however only if the clock frequency $f_4$ is selected to be sufficiently large. When there is not used the method described hereinafter for the complete elimination of such system error, it is therefore necessary to choose the selection of the clock frequency as a compromise between that affording optimum range and one which is as high as possible so as to have minimum system measuring errors.

The system measuring errors can be completely eliminated if there is disregarded a fixed clock frequency $f_4$ and such frequency is influenced by suitable circuit measures such that the value h, the number of meaned or averaged cycles, always is a whole number or integer, that is to say, the relationship $$f_4 = f_{3el}/h \cdot M$$

is chosen such that h is an integer. This can be realized, for instance, by utilizing a phase-locked method with sampling. The control signal for the frequency $f_4$ is thus advantageously derived by sampling and holding a signal, from which there is obtained, by frequency division, the cycle at the frequency $f_4$, whereas the sampling is controlled by a signal obtained by means of the frequency dividing of $f_{3en}$.

While there are shown and described present preferred embodiments of the invention, it is to be distinctly understood that the invention is not limited thereto, but may be otherwise variously embodied and practiced within the scope of the following claims.

What I claim is:

1. In a method for measuring the distance between a primary station and a secondary station, each station having an antenna for the transmission and reception of continuous wave signals modulated by a measuring signal, the distance being determined at the primary station in the form of a magnitude proportional to the quotient of the phase difference between the phase of the transmitted measuring signal and the phase of the received measuring signal and the frequency of the measuring signal, the improvement which comprises the steps of:
   transmitting from the primary station a continuous wave signal which is modulated by a measuring signal which in turn can be frequency modulated by the frequency of the measuring signal;
   additionally modulating at the secondary station this modulated continuous wave signal by a marker signal and reflecting such additionally modulated continuous wave signal in the form of a receiving signal to the primary station;
   forming at the primary station a filtered mixed product from the signal reflected by the secondary station and a local oscillator signal of the primary station;
   deriving from such filtered mixed product a useful signal freed of the frequency of the continuous wave signal and the frequency of the measuring signal;
   amplitude demodulating the useful signal to thereby obtain an evaluation signal freed of the frequency of the marker signal;
   said evaluation signal being dependent upon the phase difference between the measuring signals of the transmitted and received signals;
   utilizing the evaluation signal in a regulation circuit for a change of the mean frequency of the measuring signal of the transmitted signal such that the mean phase difference between the measuring signals of the transmitted signal and the reflected signal assumes a predetermined value at a momentary steady-state condition of the regulation circuit.

2. The method as defined in claim 1, further including the steps of:
   unambiguously determining the distance as a magnitude proportional to the mean period of the measuring signal;
   selecting as the starting condition for the build-up to a steady-state condition of the regulation circuit a predetermined low mean frequency of the measuring signal; and
   following the build-up of the regulation circuit to a steady-state condition improving the accuracy of the distance measurement, while continuing the regulation to a predetermined mean value of the phase difference by carrying out incremental increases of the mean frequency of the measuring signal by integer jump factors, so as to avoid losses in unambiguousness of the distance measurement result.

3. A circuit for measuring the distance between a primary station and a secondary station, comprising:
   a respective antenna provided for each
      said primary station and secondary station;
   said primary station containing:
      a microwave coupling circuit;
      a primary modulator and a mixer connected with said microwave coupling circuit;
      a distance evaluation circuit;
      said mixer being connected with said distance evaluation circuit;
      said distance evaluation circuit including a measuring signal frequency generator having a first output side and a second output side;
      a measuring device;
      said measuring signal frequency generator being connected at its first output side with said primary modulator and at its second output side with said measuring device;
      said measuring frequency signal generator including a controlled oscillator which modulates and controls the frequency of the measuring signal so as to assume a mean value;
      said distance evaluation circuit further including a bandpass filter;
      said measuring signal frequency generator having an input side;
      said input side of said measuring signal frequency generator being connected by means of said bandpass filter with said mixer.

4. The circuit as defined in claim 3, wherein:
   said distance evaluation circuit further includes a controllable amplifier;
   said distance evaluation circuit at its input side comprising a chain circuit of said bandpass filter and said controllable amplifier.

5. The circuit as defined in claim 3, wherein:
   said measuring signal frequency generator further includes an addition circuit having an output;

said controlled oscillator having an input connected with said output of said addition circuit;

said addition circuit having a first input and a second input;

said measuring signal frequency generator further including:

an error signal forming circuit having an input side and an output side;

a modulation signal source having an output;

said first input of said addition circuit being connected with the output side of said error signal forming circuit;

the input side of said error signal forming circuit being connected with said bandpass filter which filters out the useful signal;

the second input of the addition circuit being connected with said modulation signal source.

6. The circuit as defined in claim 5, wherein:

said primary modulator has an input side;

said measuring signal frequency generator further includes:

a frequency divider having a selectable frequency divider ratio;

a control device for controlling said frequency divider;

said frequency divider being connected with said input side of said primary modulator;

said control device during the course of an incremental change of the frequency of the measuring signal, upon presence of a steady-state condition of the regulation system, incrementally reducing the frequency divider ratio of the frequency divider by an integer jump factor.

7. The circuit as defined in claim 6, wherein:

said frequency divider has a first output and a second output, each of said outputs having respective individually selectable frequency divider ratios;

the first output of said frequency divider controlling said primary modulator;

said measuring device including a multiple-period measuring device having an input;

said second output of said frequency divider being connected with said input of said multiple-period measuring device;

both of said divider ratios being chosen by said control device to be equal for such length of time until the first build-up of the controlled oscillator to a steady-state condition has occurred during a coarse distance measurement; and during the subsequent performance of a modulation frequency jump for the fine distance measurement there is only reduced the divider ratio of the first output of the frequency divider while maintaining the divider ratio of the second output of such frequency divider.

8. The circuit as defined in claim 7, further including:

a phase-locked loop arranged between said modulation signal source and said frequency divider;

said phase-locked loop influencing the clock frequency such that the number of meaned cycles amounts to an integer.

9. The circuit as defined in claim 5, wherein:

said error signal forming circuit of said measuring signal frequency generator comprises:

a difference forming circuit having a first input side and a second input side;

said difference forming circuit being connected at its first input side with said modulation signal source;

a demodulator having an input side and an output side;

a high pass filter having an input side and an output side;

said demodulator being connected by means of its output side with said input side of said high pass filter;

said high pass filter being connected by means of its output side with said second input side of said difference forming circuit, in order to obtain the amplitude difference of the useful signal which has been demodulated in the demodulator as a desired error potential for regulation of the controlled oscillator.

10. The circuit as defined in claim 9, wherein:

said distance evaluation circuit further includes: a controllable amplifier having a control input;

said distance evaluation circuit being constituted at its input side by a chain circuit composed of said bandpass filter and said controllable amplifier;

said error signal forming circuit further including:

a mean value forming circuit having an input side and an output side;

an amplifier having an input and output;

the output side of said mean value forming circuit being connected with said input of said amplifier;

said output side of said demodulator being connected with the input side of said mean value forming circuit, whereby said output side of said demodulator is connected by means of said amplifier connected at the output side of said mean value forming circuit with the control input of said controlled amplifier, whereby said controlled amplifier is controlled such that the mean value of the amplitudes of the filtered mixed product is constant at the output of the controlled amplifier.

11. The circuit as defined in claim 9, wherein:

said error signal forming circuit further comprises a phase-locked loop connected with the input side of said demodulator.

12. The circuit as defined in claim 11, wherein:

said demodulator comprises a demodulator-multiplier having a first input and a second input;

said phase-locked loop having an output;

said first input of said demodulator-multiplier being connected with the output of said phase-locked loop and its second input being supplied with said useful signal.

13. The circuit arrangement as defined in claim 9, wherein:

said difference forming circuit comprises a multiplier; and said modulation signal source comprises a sine-wave generator.

14. The circuit as defined in claim 5, wherein:

said measuring signal frequency generator further includes an integrator;

said first input of the addition circuit being connected by means of said integrator with the output side of the error signal forming circuit.

15. The circuit as defined in claim 5, wherein:

said measuring signal frequency generator further includes a damping element;

said second input of said addition circuit being connected by means of said damping element with said modulation signal source.

16. The circuit as defined in claim 15, wherein:

said measuring signal frequency generator further includes: a frequency divider having a selectable frequency divider ratio; a control device for controlling said frequency divider;

said frequency divider being connected with an input side of said primary modulator;

said control device during the course of the incremental change of the frequency of the measuring signal, upon presence of a steady-state condition of the regulation system, incrementally reducing the frequency divider ratio of the frequency divider by an integer jump factor;

said measuring signal frequency generator further includes an integrator;

said first input of the addition circuit being connected by means of said integrator with the output side of the error signal forming circuit;

a regulation sense switch means incorporated in circuit between said modulation signal source and said error signal forming circuit;

said control device controlling said regulation sense switch means in addition to said integrator and said damping element.

17. The circuit as defined in claim 3, wherein:

said mixer is connected in circuit with said microwave coupling circuit such that said mixer receives part of the modulated transmitted signal as a local oscillator signal and the received signal.

* * * * *